Patented Nov. 27, 1951

2,576,418

UNITED STATES PATENT OFFICE 2,576,418

LIGNIN COMPOUNDS AND METHOD FOR MAKING SAME

Jörgen Richter Salvesen, Wausau, Wis., and Carlyle Harmon, Springfield, Mass., assignors to Marathon Corporation, Rothschild, Wis., a corporation of Wisconsin No Drawing. Application December 6, 1948, Serial No. 63,842

7 Claims. (Cl. 260—124)

1

This invention relates to a method for making new and useful lignin compounds from lignosulfonates by subjecting the latter to critically controlled alkaline hydrolyzing conditions.

It is well established that lignin from softwood trees is composed of propyl-guaiacol monomers condensed or polymerized to units of various molecular size. In the lignosulfonates, the sulfonic groups have entered into some of the propyl side chains, making the product soluble in aqueous acid as well as alkali solutions.

Through numerous experiments we have found that some partially desulfonated lignin compounds have unique and useful properties for various applications, but also that very specific process conditions are required to obtain the compounds with the desired properties. We have found that the alkaline hydrolysis reaction with lignosulfonates is a very complex one where numerous other factors such as condensation, carbonization, de-polymerization, alkyl-alkoxyl group shifting may affect the nature of the product produced. This invention relates to the critical conditions which we have discovered are necessary to produce useful lignin products by alkaline hydrolysis under controlled conditions which will exclude or minimize undesirable reactions.

The starting material we prefer to use in our process is a solution of substantially pure sodium lignosulfonate substantially free from calcium and magnesium ions. One source for such starting material is basic calcium lignosulfonate, obtained according to U. S. Patent Re. 18,268 obtained from waste sulfite liquor resulting from the usual commercial production of paper making pulp by treatment of wood with calcium bisulfite liquor. This product is converted to the sodium salt in known ways, i. e. by addition of sodium bicarbonate with subsequent removal of $CaCO_3$ formed, or by addition of $Na_2SO_4$ and $H_2SO_4$ and removal of $CaSO_4$ then formed. Another suitable starting material for our process is the liquor which results when the above mentioned basic calcium lignosulfonate is heated for 30 to 90 min. at 160° to 180° C. with NaOH, then if desired after extracting out phenolic compounds with substantially water immiscible alcohol according to U. S. Patent No. 2,104,701, January 4, 1938, lime salts are removed by treatment with $CO_2$ or flue gas according to the specific conditions given in U. S. Patent No. 2,371,136, March 13, 1945. Still another suitable starting material is the solution resulting when basic calcium lignosulfonate and caustic soda are heated to 150° to 180° C. for 30 to 90 minutes with continuous introduction of controlled amounts of oxygen or air. Such cooked liquor has the calcium compounds in insoluble form which can be removed by settling or filtering to give a suitable sodium lignosulfonate for our process.

2

It is to be understood that the previously described starting lignin containing materials are illustrative examples of specific starting materials that can be used in our process and that sodium lignosulfonates in general can be used in our method for producing the desired lignin compounds. We prefer to use a sodium lignosulfonate solution with solids content of from about 250 to about 350 grams per liter and to such solution NaOH is added in such amounts that the mixture contains from about 8 to 25 grams per liter free NaOH prior to digestion. This amount of NaOH added prior to the cook is usually sufficient to assure presence of some free caustic soda after digesting under conditions hereinafter set forth. Presence of free caustic soda prevents formation of a black insoluble organic residue during the pressure cook, but larger amounts of free NaOH serve no useful purpose. The solution or mixture is cooked under autogenic pressure or higher as, for example, 1000 lbs. per sq. in. at a temperature of about 215° C. We have carried out such cooks in batch operation as well as with heat exchangers and pressure holding tank. We prefer to use a cooking temperature in the range of 200°–225° C. and the solution to be maintained at such temperature for a period of 20–120 minutes. The remaining free caustic soda in the cooked liquor may be neutralized by $H_2SO_4$ or $CO_2$ addition to pH around 10.5, after which the solution may be utilized directly for any desired purpose or it may be dried to a powder by conventional means, i. e., spray or drum drying.

The product produced by the above described process is soluble in water at a pH not less than 10.5 to the extent of at least 95% by weight. It strongly absorbs oxygen. In aqueous alkaline solution it is an effective dispersing agent, i. e. for clay and other inorganic suspensions. The product has valuable properties as component in boilerwater treatment and it presents a useful starting material for preparation of pure organic degradation products from lignosulfonates.

Having fully disclosed the essential and novel features of our invention, it is to be understood that any modifications and variables utilizing the significant aspects of our invention are intended to be included within the scope of the appended claims.

We claim:

1. The process of producing a lignin compound by controlled alkaline hydrolysis comprising the steps of preparing an aqueous mixture containing sodium hydroxide in amount to provide free caustic soda in the final cooked liquor and sodium lignosulfonate substantially free from calcium and magnesium ions, and heating said mixture under pressure and at a temperature range of 200° to 225° C. for a period of 20 to 120 minutes.

2. The process of producing a lignin compound by controlled alkaline hydrolysis comprising the steps of preparing an aqueous mixture containing by weight 250 to 350 grams per liter of sodium lignosulfonate substantially free from calcium and magnesium ions, and 8 to 25 grams per liter of free caustic soda, heating said mixture under pressure and at a temperature from 200° to 225° C. for a period of 20 to 120 minutes, and neutralizing the free excess caustic soda present in the resulting solution to a pH of about 10.5.

3. The process of producing a lignin compound by controlled alkaline hydrolysis comprising the steps of preparing an aqueous mixture containing sodium lignosulfonate derived from waste sulfite liquor substantially free from calcium and magnesium ions and sodium hydroxide in amount to provide free caustic soda in the final cooked liquor, heating said mixture under pressure and at a temperature range of 200° to 225° C. for a period of 20 to 120 minutes.

4. The process of producing a lignin compound by controlled alkaline hydrolysis comprising the the steps of heating under pressure and at a temperature from 200° to 225° C. for a period of 20 to 120 minutes, an aqueous solution of sodium lignosulfonate substantially free from calcium and magnesium ions, in the presence of sufficient caustic soda so that the mixture contains free NaOH during the said hydrolysis.

5. The process of producing a lignin compound by controlled alkaline hydrolysis comprising the steps of preparing an aqueous mixture containing by weight 250 to 350 grams per liter of sodium lignosulfonate substantially free from calcium and magnesium ions, and 8 to 25 grams per liter of free caustic soda, heating said mixture under pressure and at a temperature from 200° to 225° C. for a period of 20 to 120 minutes.

6. A lignin compound soluble in water at a pH not less than 10.5 produced through controlled alkaline hydrolysis by the method of claim 2.

7. A lignin compound soluble in water at a pH not less than 10.5 to the extent of at least 95% by weight produced through controlled alkaline hydrolysis by the method of claim 1.

JÖRGEN RICHTER SALVESEN.
CARLYLE HARMON.

REFERENCES CITED

The following references are of record in the file of this patent:

UNITED STATES PATENTS

| Number | Name | Date |
|---|---|---|
| 2,077,884 | Howard et al. | Apr. 20, 1937 |
| 2,104,701 | Sandborn | Jan. 4, 1938 |
| 2,505,304 | Salvesen | Apr. 25, 1950 |